US012679514B2

(12) United States Patent
Takeuchi

(10) Patent No.: US 12,679,514 B2
(45) Date of Patent: Jul. 14, 2026

(54) OUTBOARDS ILLUMINATION DEVICE

(71) Applicant: ASAHI DENSO CO., LTD., Hamamatsu City (JP)

(72) Inventor: Keita Takeuchi, Shizuoka (JP)

(73) Assignee: ASAHI DENSO CO., LTD., Hamamatsu City (JP)

( * ) Notice: Subject to any disclaimer, the term of this patent is extended or adjusted under 35 U.S.C. 154(b) by 23 days.

(21) Appl. No.: 19/037,130

(22) Filed: Jan. 25, 2025

(65) Prior Publication Data

US 2025/0242897 A1 Jul. 31, 2025

(30) Foreign Application Priority Data

Jan. 26, 2024 (JP) ................................ 2024-010592

(51) Int. Cl.

| | |
|---|---|
| ***H05B 47/10*** | (2020.01) |
| ***B63B 45/04*** | (2006.01) |
| ***H05B 45/10*** | (2020.01) |
| ***H05B 47/155*** | (2020.01) |
| ***H05B 47/16*** | (2020.01) |

(52) U.S. Cl.

CPC ............. *B63B 45/04* (2013.01); *H05B 45/10* (2020.01); *H05B 47/155* (2020.01); *H05B 47/16* (2020.01)

(58) Field of Classification Search

CPC ...... B63B 45/04; H05B 47/16; H05B 47/155; H05B 45/10

See application file for complete search history.

(56) References Cited

U.S. PATENT DOCUMENTS

| | | | | |
|---|---|---|---|---|
| 10,259,545 | B2 | 4/2019 | Davis et al. | |
| 12,145,711 | B2 | 11/2024 | Itou | |
| 2008/0185182 | A1 * | 8/2008 | Fujino .................... | B63H 21/21 174/521 |

* cited by examiner

*Primary Examiner* — Henry Luong

(74) *Attorney, Agent, or Firm* — McDonald Hopkins LLC

(57) ABSTRACT

An outboards illumination device includes a light emission display unit which is provided with each of a plurality of outboards attached to a boat and causes a predetermined display by light emission, a light emission control unit which is provided with each of the plurality of outboards and controls the light emission of the light emission display unit, a synchronization unit which is provided with each of the plurality of outboards and enables to transmit or receive a synchronization signal for controlling display timing of the light emission display units between the light emission control units of the respective outboards, and a setting unit which sets as operated, among a plurality of the synchronization units provided with the plurality of outboards respectively, a main synchronization unit that exclusively transmits the synchronization signal and a sub synchronization unit that exclusively receives the synchronization signal transmitted from the main synchronization unit.

6 Claims, 6 Drawing Sheets

OUTBOARDS ILLUMINATION DEVICE

CROSS-REFERENCE TO RELATED APPLICATIONS

This application is based on and claims priority under 35 USC 119 from Japanese Patent Application No. 2024-010592 filed on Jan. 26, 2024, the entire content of which is incorporated herein by reference.

TECHNICAL FIELD

The present disclosure relates to an outboards illumination device in which an outboard of a boat is equipped with a light emission display unit capable of causing a predetermined display by light emission.

BACKGROUND ART

In general, an outboard motor attached to a rear side of a boat includes a drive source such as an engine inside and a propeller rotatable by a driving force of the drive source, and obtains a propulsive force of the boat by rotational driving of the propeller. In the related art, the outboard motor of the boat such as a pleasure boat is equipped with a decorative light-emitting diode (LED) as a light emission display unit. Since the related art is not related to the publicly known disclosure, there is no related art literature information to be described.

In a case where a plurality of outboard motors are attached to the boat, it is possible to enhance a decorative effect by turning on or turning off light emission display units attached to the outboard motors respectively. However, in a case where various displays are caused by light emission, it is necessary to control and synchronize display timing of the respective light emission display units. For example, in a case where the decorative effect is achieved by causing the light emission display unit of each of the outboard motors to perform the light emission in order according to the passage of time or in a case where the displays by the respective light emission display units are combined to form one display form, it is necessary to control and synchronize the display timing of the respective light emission display units with high accuracy. Since the related art is not related to the publicly known disclosure, there is no related art literature information to be described.

SUMMARY OF INVENTION

An object of the present disclosure is to provide an outboards illumination device capable of efficiently controlling display timing of light emission display units provided with a plurality of outboards respectively, and accurately synchronizing the display timing.

A first aspect of the present disclosure relates to an outboards illumination device including:

- a light emission display unit provided with each of a plurality of outboards attached to a boat, and configured to cause a predetermined display by light emission;
- a light emission control unit provided with each of the plurality of outboards, and configured to control the light emission of the light emission display unit;
- a synchronization unit provided with each of the plurality of outboards, and allowed to transmit or receive a synchronization signal for controlling display timing of the light emission display units between the light emission control units of the respective outboards; and
- a setting unit configured to set as operated, among a plurality of the synchronization units provided with the plurality of outboards respectively, a main synchronization unit that exclusively transmits the synchronization signal and a sub synchronization unit that exclusively receives the synchronization signal transmitted from the main synchronization unit.

In a second aspect of the present disclosure, there is provided an outboards illumination device according to the first aspect of the present disclosure,

- in which each of the outboards is equipped with a storage unit configured to store information about the main synchronization unit and the sub synchronization unit set by the setting unit.

In a third aspect of the present disclosure, there is provided an outboards illumination device according to the first aspect of the present disclosure,

- in which the light emission control unit is configured to forcibly stop the light emission of the light emission display unit according to remaining power of a battery that supplies power to the light emission display unit.

In a fourth aspect of the present disclosure, there is provided an outboards illumination device according to the first aspect of the present disclosure,

- in which the light emission display unit includes a display panel having a plurality of light-emitting diodes attached to each outboard, and
- the light-emitting diodes are selectively turned on and off in predetermined color and at predetermined timing to perform a predetermined display.

In a fifth aspect of the present disclosure, there is provided an outboards illumination device according to the fourth aspect of the present disclosure,

- in which the light emission display unit is configured to selectively turn on and off the light-emitting diodes in predetermined color and at predetermined timing to perform a display as a stern light or a display of an emergency rescue request.

In a sixth aspect of the present disclosure, there is provided an outboards illumination device according to the first aspect of the present disclosure, further including:

- an operation unit configured to receive an operation for setting by the setting unit, and including the synchronization unit,
- in which the synchronization unit of the operation unit is set as the main synchronization unit.

According to the first aspect of the present disclosure, the outboards illumination device includes the synchronization unit provided with each of the plurality of outboards and capable of transmitting or receiving the synchronization signal for controlling the display timing of the light emission display units between the light emission control units of the respective outboards, and the setting unit capable of setting as operated, among the synchronization units provided with the plurality of outboards respectively, the main synchronization unit that exclusively transmits the synchronization signal and the sub synchronization unit that exclusively receives the synchronization signal transmitted from the main synchronization unit. Therefore, the display timing of the light emission display units provided with the plurality of outboards respectively can be efficiently controlled and accurately synchronized. Further, since the main synchronization unit and the sub synchronization unit can be changed by setting as operated, it is possible for the outboards illumination device to be flexibly applied according to a change in specifications of the boat (for example, a case where the number of outboards is changed from three to four).

According to the second aspect of the present disclosure, each outboard is equipped with the storage unit configured to store the information about the main synchronization unit and the sub synchronization unit set by the setting unit. Therefore, the synchronization can be achieved by setting contents stored in the storage unit when the outboards illumination device is operated, and time and effort can be saved as compared with a case where the setting operation by the setting unit is required to be repeated.

According to the third aspect of the present disclosure, since the light emission control unit forcibly stops the light emission of the light emission display unit according to the remaining power of the battery that supplies power to the light emission display unit, the power consumption of the battery can be suppressed.

According to the fourth aspect of the present disclosure, the light emission display unit includes the display panel having the plurality of light-emitting diodes attached to each outboard, and the light-emitting diodes are selectively turned on and off in the predetermined color and at the predetermined timing to perform a predetermined display. Therefore, it is possible to cause each of the light-emitting diodes to function as the pixel and display the desired design, pattern, character, and the like delicately.

According to the fifth aspect of the present disclosure, since the light emission display unit is configured to selectively turn on and off the light-emitting diodes in the predetermined color and at the predetermined timing to perform the display as the stern light or the display of the emergency rescue request, the display of the light emission display unit can also have a predetermined role in addition to a decorative light emission display.

According to the sixth aspect of the present disclosure, the operation unit configured to receive an operation for setting by the setting unit is provided, the operation unit includes the synchronization unit, and the synchronization unit of the operation unit is set as the main synchronization unit. Therefore, it can be unnecessary to provide wiring for connecting the plurality of outboards.

BRIEF DESCRIPTION OF DRAWINGS

Exemplary embodiment(s) of the present invention will be described in detail based on the following figures, wherein.

DESCRIPTION OF EMBODIMENTS

Hereinafter, embodiments of the present disclosure will be specifically described with reference to the drawings.

Figure 3:
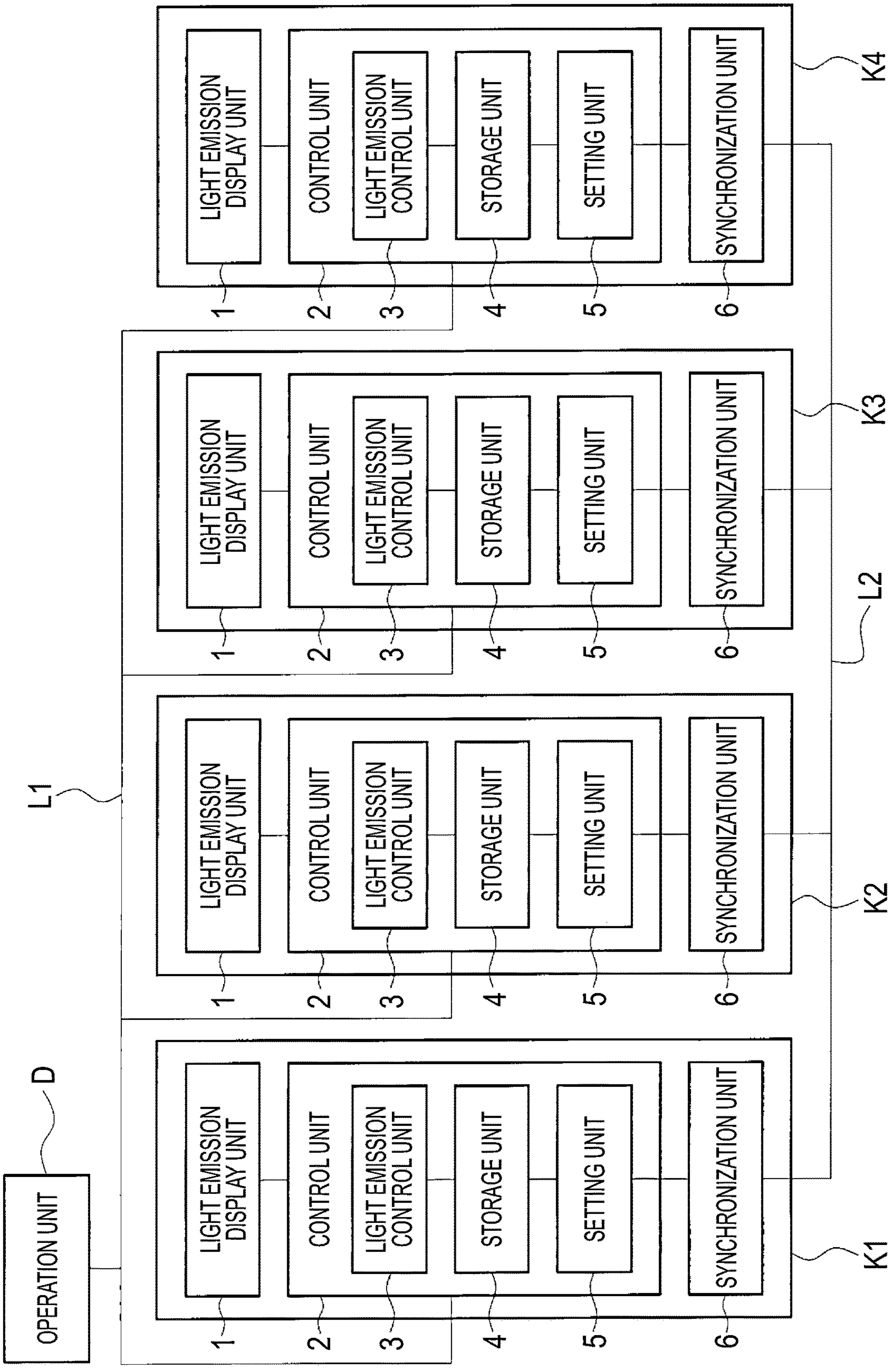
FIG. 3 is a block diagram showing an overall configuration of the outboards illumination devices provided with a plurality of outboards.
Figure 4:
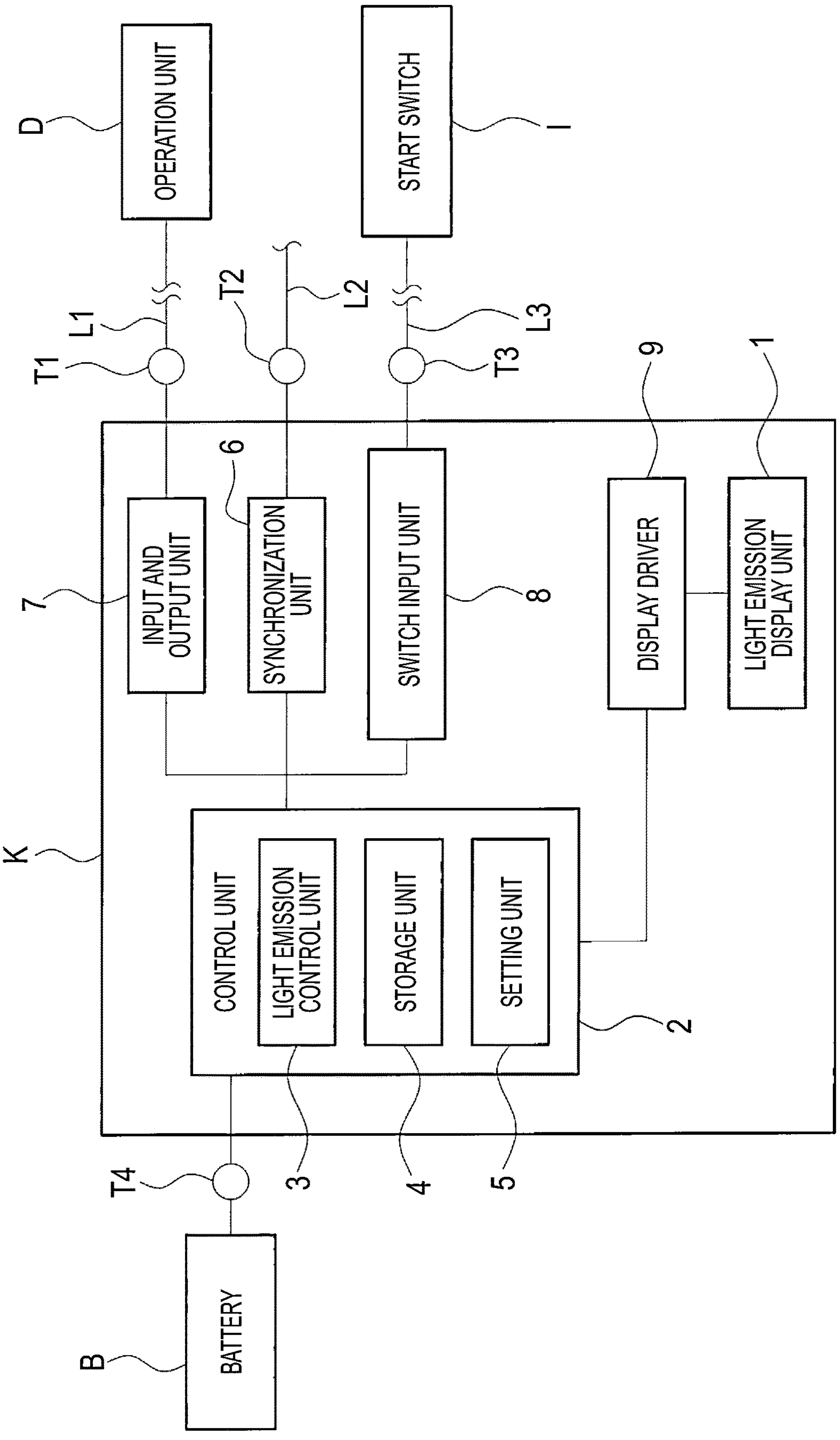
FIG. 4 is a block diagram showing a configuration of the outboards illumination device provided with a specific outboard.

In an outboards illumination device according to a first embodiment, a light emission display unit 1 capable of causing a predetermined display by light emission is provided with an outboard K such as an outboard motor of a boat H. As shown in FIGS. 3 and 4, the outboards illumination device includes the light emission display unit 1, a control unit 2 provided with a light emission control unit 3, a storage unit 4, and a setting unit 5, a synchronization unit 6, and an operation unit D.

Figure 1:
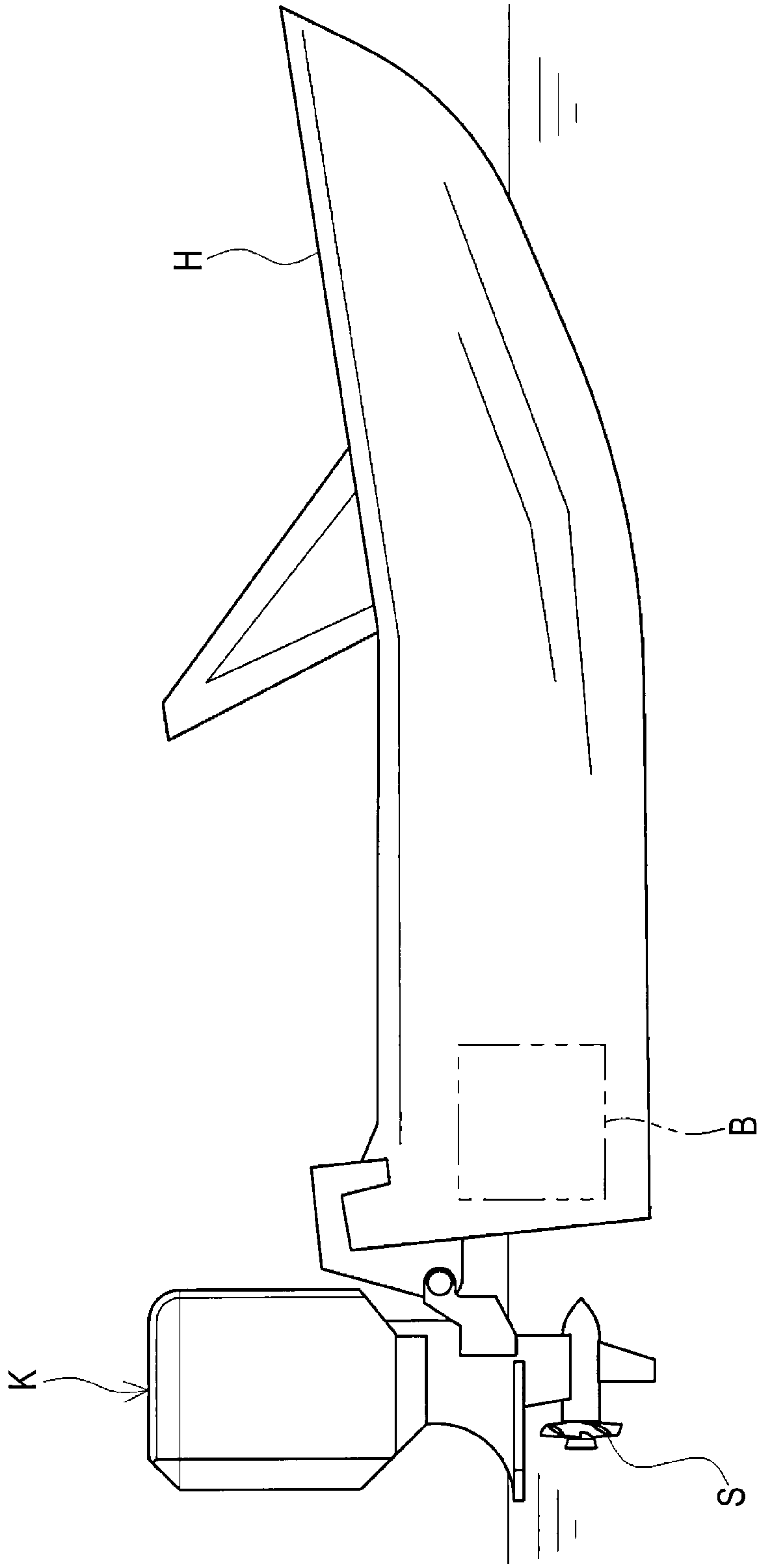
FIG. 1 is a schematic side view of a boat equipped with outboards illumination devices according to a first embodiment of the present disclosure.
Figure 2:
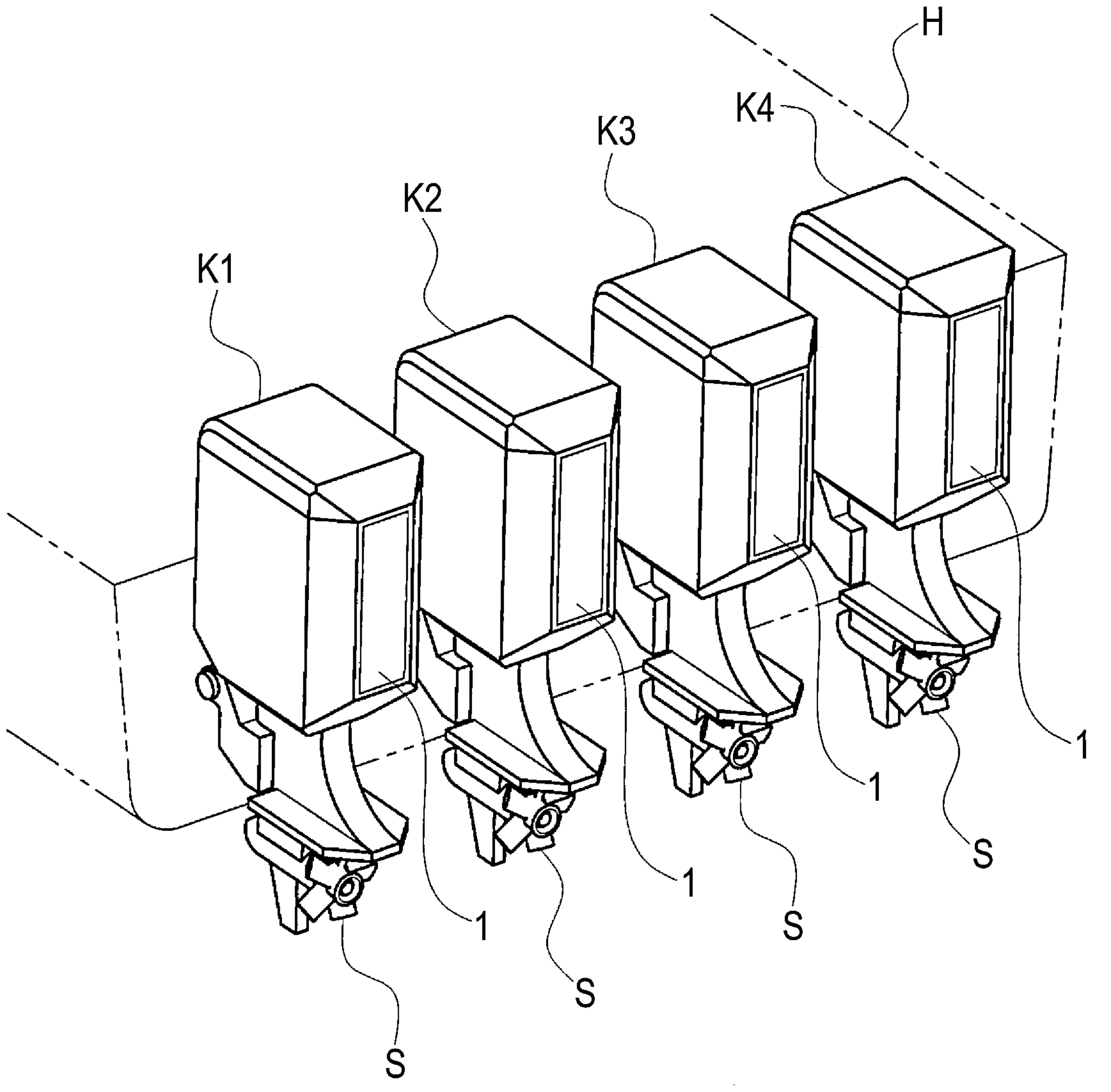
FIG. 2 is a perspective view showing outboards attached to the boat.

As shown in FIGS. 1 and 2, the boat H applied to the present disclosure is equipped with the plurality of (four in the present embodiment) outboards K (K1 to K4) to a rear side of the boat H (so-called multi-machine equipped), a drive source such as an engine is provided within each outboard K, and a propeller S driven by the drive source is attached thereto. When a start switch I (see FIG. 4) provided with the boat His operated to start the drive source such as the engine, the propeller S is rotationally driven to obtain a propulsive force of the boat H.

As shown in FIG. 4, each of the outboards (K1 to K4) applied to the present embodiment is connected to a battery B provided in the boat H via a terminal T4, making it possible to supply power to the light emission display unit 1, the control unit 2, and the like constituting the outboards illumination device. The light emission display unit 1 is provided with each of the plurality of outboards K, can cause the predetermined display by the light emission, and is implemented by a display panel having a plurality of light-emitting diodes (LEDs) attached to each of the outboards K.

The light emission display unit 1 according to the present embodiment is configured to perform a predetermined display since a display driver 9 selectively turns on and off the plurality of light-emitting diodes in predetermined color and at predetermined timing. That is, each of the light-emitting diodes functions as a pixel, and by selectively turning on or off each of the light-emitting diodes by the display driver 9, display in a predetermined form (for example, display of a design, a pattern, a character, or the like) can be performed on the entire screen of the light emission display unit 1.

The control unit 2 controls the display of the light emission display unit 1, and includes the light emission control unit 3, the storage unit 4, and the setting unit 5. The light emission control unit 3 is provided with each of the plurality of outboards K, and includes a microcomputer and the like for controlling the light emission of the light emission display unit 1. The light emission control unit 3 is configured to cause the light emission display unit 1 to display in a predetermined form. Accordingly, for example, the light emission control units 3 can cause the light emission display units 1 of the four outboards (K1 to K4) to sequentially display predetermined designs, patterns, or characters, and can cause the light emission display units 1 of the four outboards (K1 to K4) to display one design, pattern, or character by combining the displays thereof.

The storage unit 4 includes a memory and the like for storing desired data and information, and can store control contents (data and information) relating to a display form of the light emission display unit 1. For example, information on a plurality of types of display forms is stored in the storage unit 4 according to the present embodiment. When the display form is selected by the light emission control unit 3, the control unit 2 acquires information on the selected display form from the storage unit 4 and controls the display of the light emission display unit 1.

The synchronization unit 6 is provided with each of the plurality of outboards K, and includes a microcomputer, a control circuit, and the like capable of transmitting or receiving a synchronization signal for controlling display timing of the light emission display units 1 between the light emission control units 3 of the respective outboards K. That is, the synchronization unit 6 provided with each of the outboards K is electrically connected to the control unit 2 and connected to the synchronization unit 6 of the adjacent outboard K by a wiring L2, so that the synchronization signal can be transmitted and received. In FIG. 4, reference numeral T2 indicates a terminal to which the wiring L2 is connected and for connecting the adjacent synchronization unit 6.

The setting unit 5 includes a microcomputer, a switching control circuit, and the like that can set (assign) as operated, among the synchronization units 6 provided with the plurality of outboards K respectively, a main synchronization unit that exclusively transmits a synchronization signal and a sub synchronization unit that exclusively receives the synchronization signal transmitted from the main synchronization unit. That is, the setting unit 5 can set (assign) the synchronization unit 6 in the specific outboard K among the plurality of outboards (K1 to K4) as the main synchronization unit, and can set (assign) the synchronization unit 6 in other outboard(s) K as the sub synchronization unit.

When the display of the light emission display unit 1 is controlled by the control unit 2, the synchronization unit 6 set as the main synchronization unit in the specific outboard K exclusively transmits, via the wiring L2, the synchronization signal for controlling the display timing (for example, the timing of turning on and off the light-emitting diodes for representing the design, the pattern, or the character in each light emission display unit 1). Further, the synchronization unit 6 set as the sub synchronization unit in the other outboard K exclusively receives the synchronization signal transmitted from the main synchronization unit via the wiring L2, and synchronizes the display of the light emission display unit 1 controlled by the control unit 2 based on the synchronization signal.

The operation unit D receives a user's operation, and includes a controller for a user to perform setting by the setting unit 5. The operation unit D is disposed in the boat H, and is connected to the input and output unit 7 provided with each of the outboards (K1 to K4). The input and output unit 7 is electrically connected to the control unit 2 provided with each of the outboards K, and is connected to the operation unit D via a wiring L1. Note that T1 in FIG. 4 indicates a terminal to which the wiring L1 is connected and for connecting the operation unit D to the input and output unit 7.

The user can operate the operation unit D to set the synchronization unit 6 of the specific outboard K as the main synchronization unit. In this case, the synchronization unit 6 of the specific outboard K selected as the main synchronization unit transmits an operation signal to the other outboards K via the wiring L2. The setting unit 5 in the other outboard K sets (assigns) the sub synchronization unit based on the operation signal. For example, when the user sets the synchronization unit 6 of the outboard K1 as the main synchronization unit, the setting unit 5 in the outboard K1 sets (assigns) each of the setting units 5 in the outboards K2, K3, and K4 as the sub synchronization unit.

A switch input unit 8 includes a microcomputer, a switching control circuit, and the like electrically connected to the control unit 2, and is connected to the start switch I of the boat H via a wiring L3. In the outboard K, when the start switch I is operated and the engine, which is the drive source of the outboard K, is started, a start signal is transmitted to the switch input unit 8, and the predetermined display of the light emission display unit 1 is stopped (all the light-emitting diodes formed in the light emission display unit 1 are turned off) under the control of the control unit 2. Note that T3 in FIG. 4 indicates a terminal to which the wiring L3 is connected and for connecting the start switch I to the switch input unit 8.

Here, the storage unit 4 according to the present embodiment is configured to store the information (assignment state) about the main synchronization unit and the sub synchronization unit set by the setting unit 5 in addition to the storage of the control contents related to the display form of the light emission display unit 1. Accordingly, when the outboards illumination device is operated, synchronization can be achieved by setting contents stored in the storage unit 4, and time and effort can be saved as compared with a case where the setting operation by the setting unit 5 is required to be repeated.

The light emission control unit 3 according to the present embodiment forcibly stops the light emission of the light emission display unit 1 (forcibly turns off all the light-emitting diodes formed in the light emission display unit 1) according to remaining power of the battery B that supplies power to the light emission display unit 1 (more specifically, the entire outboards illumination device). Accordingly, the light emission control unit 3 according to the present embodiment can suppress the consumption of the battery B.

Further, since the light emission display unit 1 according to the present embodiment includes the display panel having the plurality of light-emitting diodes attached to each outboards K, and the light-emitting diodes are selectively turned on and off in the predetermined color and at the predetermined timing to perform a predetermined display, it is possible to cause each of the light-emitting diodes to function as the pixel and display the desired design, pattern, or character delicately.

In addition, the light emission display unit 1 according to the present embodiment selectively turns on and off the light-emitting diodes in the predetermined color and at the predetermined timing to perform a display as a stern light (in this case, white lighting) or a display of an emergency rescue request (display of "SOS"). Accordingly, the light emission display unit 1 according to the present embodiment can perform a light emission display having a predetermined role (security by the stern light or the emergency rescue request) in addition to a decorative light emission display.

Further, some outboards K may have a tilt-up function (a function of pulling up the outboard). In the light emission display unit 1 according to the present embodiment, the light emission display unit 1 is directed upward by utilizing the tilt-up function of the outboard K, making the security by the stern light or the emergency rescue request easier to see from an aircraft in the sky.

The outboards illumination device of the above embodiment includes the synchronization unit 6 provided with each of the plurality of outboards (K1 to K4) and capable of transmitting or receiving the synchronization signal for controlling the display timing of the light emission display units 1 between the light emission control units 3 of the respective outboards (K1 to K4), and the setting unit 5 capable of setting as operated, among the synchronization units 6 provided with the plurality of outboards (K1 to K4) respectively, the main synchronization unit that exclusively transmits the synchronization signal and the sub synchronization unit that exclusively receives the synchronization signal transmitted from the main synchronization unit. Therefore, the display timing of the light emission display units 1 provided with the plurality of outboards (K1 to K4)

respectively can be efficiently controlled and accurately synchronized. Further, the main synchronization unit and the sub synchronization unit can be changed by setting as operated. Therefore, the outboards illumination device of the present embodiment can be flexibly applied according to a change in specifications of the boat (for example, a case where the number of outboards K is changed from three to four).

Next, a second embodiment of the present disclosure will be specifically described with reference to the drawings.

Figure 5:
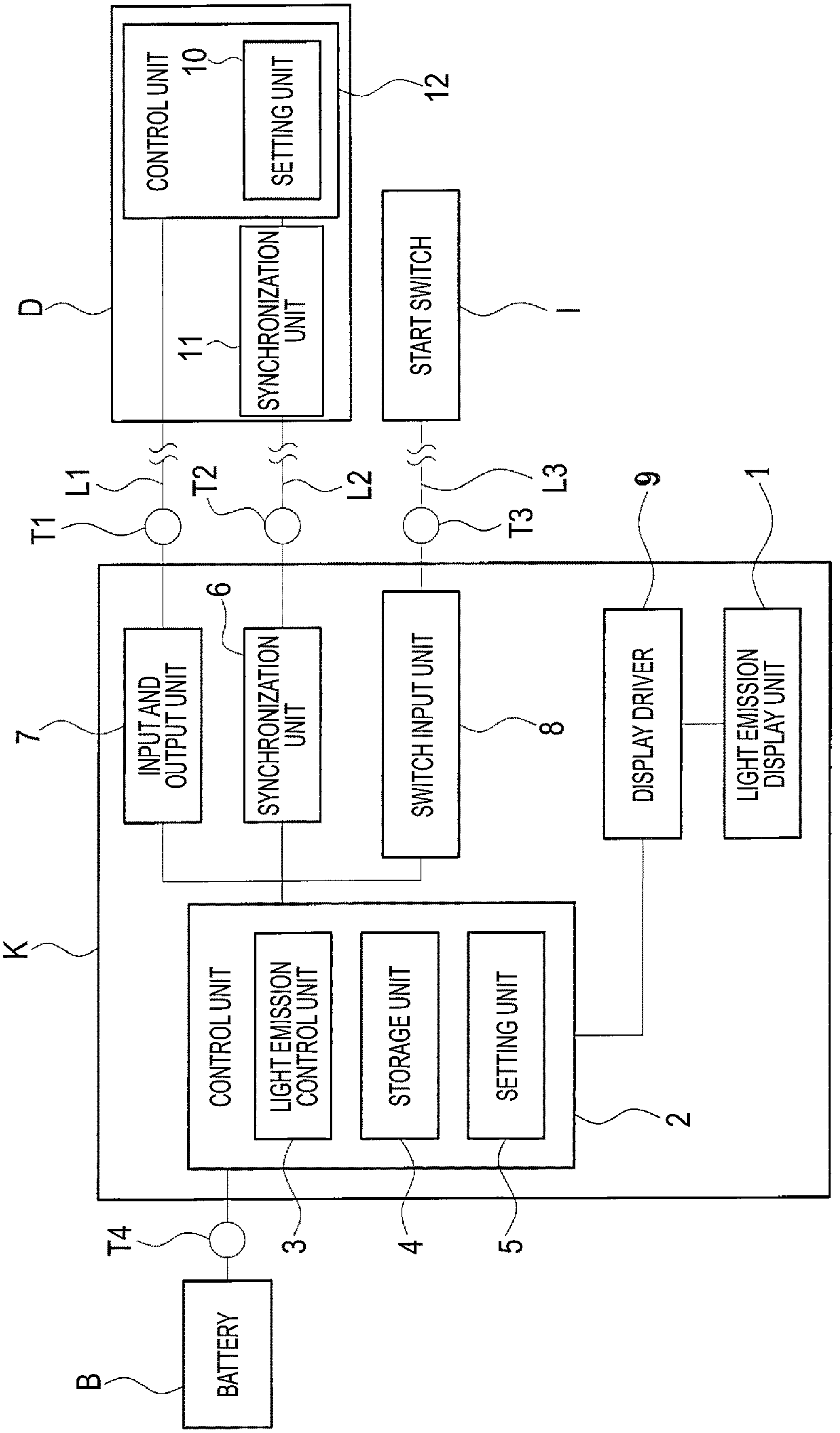
FIG. 5 is a block diagram showing a configuration of an outboards illumination device according to a second embodiment of the present disclosure.

As shown in FIG. 5, the operation unit D according to the present embodiment includes a setting unit 10 and a synchronization unit 11. The same components as those in the first embodiment are denoted by the same reference numerals, and detailed description thereof is omitted.

The setting unit 10 in the operation unit D according to the present embodiment includes a microcomputer, a switching control circuit, and the like capable of setting (assigning) the synchronization unit 11 as the main synchronization unit. A user can operate the operation unit D to set the synchronization unit 11 of the operation unit D as the main synchronization unit. In this case, as in the first embodiment, the operation unit D transmits an operation signal to each of the outboards K (K1 to K4) via the wiring L1. The setting unit 5 in each of the outboards (K1 to K4) sets (assigns) the synchronization unit 6 as the sub synchronization unit based on the operation signal.

The synchronization unit 11 in the operation unit D according to the present embodiment is connected to the synchronization unit 6 of at least one outboard K by the wiring L2. When the user sets the synchronization unit 11 as the main synchronization unit, the synchronization unit 11 exclusively transmits, via the wiring L2, a synchronization signal for controlling the display timing of the light emission display unit 1 of the outboard K (for example, the timing of turning on and off the light-emitting diodes for representing a design, a pattern, or a character in each light emission display unit 1). Further, the synchronization unit 6, which is set as the sub synchronization unit in each of the outboards (K1 to K4), exclusively receives the synchronization signal transmitted from the main synchronization unit via the wiring L2, and synchronizes the display of the light emission display unit 1 controlled by the control unit 2 based on the synchronization signal.

According to the present embodiment, since the operation unit D which receives a user's operation for setting by the setting unit 10 is provided, the operation unit D includes the synchronization unit 11, and the synchronization unit 11 of the operation unit D is set as the main synchronization unit, it can be unnecessary to provide wiring for connecting the plurality of outboards K.

Next, a third embodiment of the present disclosure will be specifically described with reference to the drawings.

Figure 6:
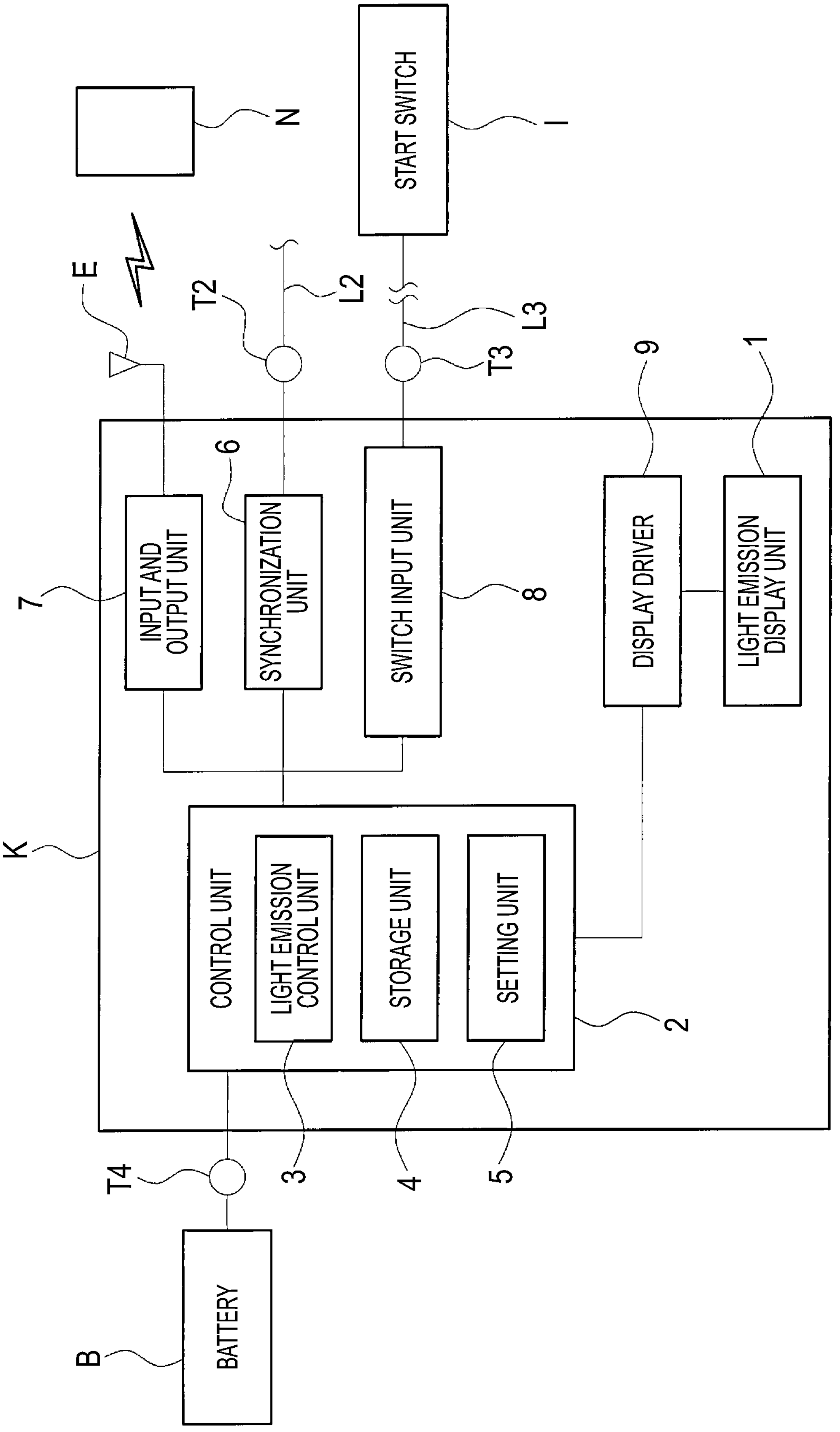
FIG. 6 is a block diagram showing a configuration of an outboards illumination device according to a third embodiment of the present disclosure.

As shown in FIG. 6, an outboards illumination device according to the present embodiment includes a mobile terminal N instead of the operation unit D according to the first and second embodiments. The mobile terminal N includes a communication terminal such as a smartphone or a tablet carried by the user, or a mobile key that may unlock various locks of the boat H and start a drive source. Further, each of the outboards K according to the present embodiment includes an antenna E that receives an operation signal of the mobile terminal N by wireless communication instead of the wiring L1 and the terminal T1 according to the first and second embodiments. In the present embodiment, the same components as those in the first and second embodiments are denoted by the same reference numerals, and detailed description thereof is omitted.

The user can operate the mobile terminal N to select the synchronization unit 6 of the specific outboard K as the main synchronization unit. In this case, the mobile terminal N transmits the operation signal to each of the outboards K via the antenna E. The setting unit 5 in each of the outboards K sets (assigns) the main synchronization unit and the sub synchronization unit based on the operation signal. In the present embodiment, as in the operation unit D according to the second embodiment, the mobile terminal N may be set (assigned) as the main synchronization unit, and the synchronization units 6 of all the outboards K may be set (assigned) as the sub synchronization unit.

Although the first, second, and third embodiments have been described above, the present invention is not limited thereto. For example, the input and output unit 7 according to the first and second embodiments is connected to the operation unit D via the wiring L1 and can receive an operation signal from the operation unit D, but may receive an operation signal by wireless communication instead of the communication via the wiring L1. Similarly, in the first, second, and third embodiments, the wireless communication may be performed instead of the communication via the wirings L2 and L3.

Further, the main synchronization unit and the sub synchronization unit may be set by directly operating the setting unit 5 by connecting a personal computer and the like to the control unit 2 without using the operation unit D or the mobile terminal N. However, the operation unit D or the mobile terminal N may perform other operations (for example, a selection operation of whether to forcibly stop the light emission of the light emission display unit 1 according to remaining power of the battery B) in addition to the operation for performing the setting by the setting unit 5.

Further, the storage unit 4 according to the present embodiment is configured to store the setting (assignment state) of the main synchronization unit and the sub synchronization unit by the setting unit 5 in addition to the storage of the control contents related to the display form of the light emission display unit 1, but may only store the information (assignment state) about the main synchronization unit and the sub synchronization unit set by the setting unit 5.

In addition, according to the outboards illumination device of the present embodiment, when the start switch I is operated and the engine, which is the drive source of the outboard K, is started, the predetermined display of the light emission display unit 1 is stopped, but the predetermined display of the light emission display unit 1 may be continued even when the engine is started. Further, although the battery B mounted on the outboard K is commonly used for the power supply of the outboards illumination device, a dedicated battery may be used.

The light emission display unit 1 according to the present embodiment includes a display panel having a plurality of light-emitting diodes. The plurality of light-emitting diodes may be arranged in a straight line or in any shape. The light emission display unit 1 may be formed with a single light-emitting diode. The outboards illumination device according to the present embodiment includes the light emission display unit 1 and the like in each of the four outboards (K1 to K4), but the number of the outboards K is not limited to four as long as the plurality of outboards K are provided.

INDUSTRIAL APPLICABILITY

As long as the outboards illumination devices have the same purpose, they may have different external shapes or may have other functions added thereto.

What is claimed is:

1. An outboards illumination device comprising:

a light emission display unit provided with each of a plurality of outboards attached to a boat, and configured to cause a predetermined display by light emission;

a light emission control unit provided with each of the plurality of outboards, and configured to control the light emission of the light emission display unit;

a synchronization unit provided with each of the plurality of outboards, and allowed to transmit or receive a synchronization signal for controlling display timing of the light emission display units between the light emission control units of the respective outboards; and a setting unit configured to set as operated, among a plurality of the synchronization units provided with the plurality of outboards respectively, a main synchronization unit that exclusively transmits the synchronization signal and a sub synchronization unit that exclusively receives the synchronization signal transmitted from the main synchronization unit.

2. The outboards illumination device according to claim 1, wherein each of the outboards is equipped with a storage unit configured to store information about the main synchronization unit and the sub synchronization unit set by the setting unit.

3. The outboards illumination device according to claim 1, wherein the light emission control unit is configured to forcibly stop the light emission of the light emission display unit according to remaining power of a battery that supplies power to the light emission display unit.

4. The outboards illumination device according to claim 1, wherein the light emission display unit includes a display panel having a plurality of light-emitting diodes attached to each outboard, and the light-emitting diodes are selectively turned on and off in predetermined color and at predetermined timing to perform a predetermined display.

5. The outboards illumination device according to claim 4, wherein the light emission display unit is configured to selectively turn on and off the light-emitting diodes in predetermined color and at predetermined timing to perform a display as a stern light or a display of an emergency rescue request.

6. The outboards illumination device according to claim 1, further comprising:

an operation unit configured to receive an operation for setting by the setting unit, and including the synchronization unit, wherein the synchronization unit of the operation unit is set as the main synchronization unit.

* * * * *